United States Patent [19]

Laughner

[11] Patent Number: 4,929,672

[45] Date of Patent: May 29, 1990

[54] POLYCARBONATE MODIFIED WITH A GRAFTED OLEFIN COPOLYMER

[75] Inventor: Michael K. Laughner, Lake Jackson, Tex.

[73] Assignee: The Dow Chemical Company, Midland, Mich.

[21] Appl. No.: 347,846

[22] Filed: May 4, 1989

[51] Int. Cl.$^5$ .............................................. C08L 51/08
[52] U.S. Cl. ........................................ 525/63; 525/67; 525/92; 525/146; 525/148; 525/439; 525/468
[58] Field of Search ................... 525/63, 468, 67, 92, 525/146, 148, 439; 528/392

[56] References Cited

U.S. PATENT DOCUMENTS

| | | | |
|---|---|---|---|
| 3,431,224 | 3/1969 | Goldblum | 260/13 |
| 3,813,358 | 5/1974 | O'Connell | 260/16 |
| 4,390,657 | 6/1983 | Liu | 524/504 |
| 4,536,542 | 8/1985 | Allen | 525/67 |
| 4,677,162 | 6/1987 | Grigo et al. | 525/67 |

Primary Examiner—Theodore E. Pertilla
Attorney, Agent, or Firm—John A. Langworthy

[57] ABSTRACT

A polycarbonate blend of good impact strength, solvent resistance and weldline properties is prepared by admixing with polycarbonate a grafted olefin/carbon monoxide copolymer and, optionally, a toughening agent such as a rubber.

24 Claims, No Drawings

POLYCARBONATE MODIFIED WITH A GRAFTED OLEFIN COPOLYMER

BACKGROUND OF THE INVENTION

This invention relates to compositions containing polycarbonate blended with other polymers, and relates particularly to polycarbonate compositions having both improved solvent resistance and improved impact strength.

Polycarbonate has found many uses because, in general, it combines a high level of heat resistance and dimensional stability with good insulating and non-corrosive properties, and it is easily molded. It does, however, suffer from a tendency to craze and crack under the effects of environmental stress, especially contact with organic solvents such as gasoline. Polycarbonate which has crazed is, undesirably, more likely to experience brittle rather than ductile failure. This disadvantage has been somewhat relieved by the practice of blending polycarbonate with various substances such as the olefin polymers polyethylene, polypropylene or polyisobutylene, as described for example in Goldblum, U.S. Pat. No. 3,431,224 (GE). These added substances are capable of improving the resistance of polycarbonate to solvents, but they tend to cause an offsetting reduction in the toughness, impact resistance and weldline strength of the blended composition. Additionally, it is frequently found that when polycarbonate is modified with substances such as polyolefins, the added substances tend to separate in the blend from the polycarbonate and delaminate as evidenced by peeling or splintering. It would accordingly be desirable if substances admixed with polycarbonate for the purpose of improving the environmental stress (e.g. solvent) failure resistance ("ESFR") thereof did not also deleteriously affect its toughness and impact and weldline strength, and cause delamination as evidenced by peeling or splintering.

SUMMARY OF THE INVENTION

This invention involves a composition of matter containing, in admixture, an aromatic carbonate polymer and a grafted olefin/carbon monoxide copolymer. This invention also involves a composition of matter comprising, in admixture, an aromatic polycarbonate and an anti-delamination agent, a suitable class of anti-delamination agents being grafted olefin/carbon monoxide copolymers. In another aspect, this invention involves an anti-delamination agent, as well as a composition of matter containing, in admixture, an aromatic polycarbonate and an amount of a strengthening substance effective to impart, to objects molded from said composition, substantially improved environmental stress failure resistance without substantial loss in impact resistance, a suitable class of strengthening substances being grafted olefin/carbon monoxide copolymers. This invention also involves a method of protecting a molded polycarbonate article from delamination by admixing polycarbonate with an anti-delamination agent.

It has been found that a blended composition prepared by blending or admixing polycarbonate and a grafted olefin copolymer possesses levels not only of ESFR but also of toughness, impact resistance and weldline strength which are improved over those of polycarbonate not blended with such a grafted copolymer.

The compositions of this invention are useful, for example, in the production of films, fibers, extruded sheets, multi-layer laminates and molded or shaped articles of virtually all varieties, especially appliance and instrument housings, automobile body panels and other components for use in the automotive and electronics industries.

DETAILED DESCRIPTION OF THE INVENTION

The compositions of this invention are those in which polycarbonate has been admixed in a blended composition with (1) a grafted olefin copolymer, and (2) optionally a toughening agent such as a butyl acrylate or methacrylate/butadiene/styrene ("MBS") rubber. Suitable ranges of content for the compositions of this invention, by percent of weight of the total composition, are as follows: polycarbonate from about 40% to about 99%, grafted olefin copolymer from about 1% to about 60%, and toughening agent up to about 20%. Compositions prepared within the above ranges of content possess levels of a combination of not only ESFR, but also toughness and impact and weldline strength, which are improved over those of polycarbonate not blended with the above mentioned components.

Preparation of the compositions of this invention can be accomplished by any suitable means known in the art. Typically the substances to be admixed with polycarbonate in the composition being made are dry blended in particulate form with sufficient agitation to obtain thorough distribution thereof within the polycarbonate. If desired, the dry-blended formulation can further, but need not, be melt mixed in an extruder, although mixing rolls, a dough-mixer or a Banbury mixer can also be used for such purpose. Alternatively, a master batch formulation can be prepared containing polycarbonate and the substances to be admixed or blended with it wherein polycarbonate is present in only a minor proportion, e.g. 20%. The master batch is then available for storage or shipment in commerce, and can be diluted with additional polycarbonate at the time of use. The compositions of this invention can be formed or molded using conventional techniques such as compression, injection, calendering, vacuum forming, extrusion and/or blow molding techniques, alone or in combination. The compositions can also be formed into films, fibers, multi-layer laminates or extruded sheets on any machine suitable for such purpose.

Polycarbonate. The aromatic polycarbonates suitable for use in the present invention are produced by any of the conventional processes known in the art for the manufacture of polycarbonates. Generally, aromatic polycarbonates are prepared by reacting an aromatic dihydric phenol with a carbonate precursor, such as for example phosgene, a haloformate or a carbonate ester.

A preferred method for preparing the aromatic polycarbonates suitable for use in the present invention involves the use of a carbonyl halide, such as phosgene, as the carbonate precursor. This method involves passing phosgene gas into a reaction mixture containing an activated dihydric phenol, or a nonactivated dihydric phenol and an acid acceptor, such as for example pyridine, dimethyl aniline, quinoline and the like. The acid acceptor may be used undiluted or diluted with inert organic solvents, such as methylene chloride, chlorobenzene or 1,2-dichloroethane. Tertiary amines are advantageous since they are good solvents as well as acid acceptors during the reaction.

The temperature at which the carbonyl halide reaction proceeds may vary from below 0° C. to about 100° C. The reaction proceeds satisfactorily at temperatures from room temperature to 50° C. Since the reaction is exothermic, the rate of phosgene addition may be used to control the temperature of the reaction. The amount of phosgene required will generally depend upon the amount of dihydric phenol present. Generally speaking, one mole of phosgene will react with one mole of dihydric phenol to form the polycarbonate and two moles of HCl. The HCl is in turn taken up by the acid acceptor.

Another method for preparing the aromatic polycarbonates useful in the present invention comprises adding phosgene to an alkaline aqueous suspension of dihydric phenols. This is preferably done in the presence of inert solvents such as methylene chloride, 1,2-dichloroethane and the like. Quaternary ammonium compounds may be employed to catalyze the reaction.

Yet another method for preparing such aromatic polycarbonates involves the phosgenation of an agitated suspension of an anhydrous alkali salt of an aryl diol in a nonaqueous medium such as benzene, chlorobenzene or toluene. The reaction is illustrated by the addition of phosgene to a slurry of the sodium salt of, for example, Bisphenol A in an inert polymer solvent such as chlorobenzene.

Generally speaking, a haloformate such as the bishaloformate of Bisphenol A may be used in place of phosgene as the carbonate precursor in any of the methods described above.

When a carbonate ester is used as the carbonate precursor in the polycarbonate-forming reaction, the materials are reacted at temperatures in excess of 100° C., for times varying from 1 to 15 hours. Under such conditions, ester interchange occurs between the carbonate ester and the dihydric phenol used. The ester interchange is advantageously consummated at reduced pressures on the order of from about 10 to about 100 millimeters of mercury, preferably in an inert atmosphere such as nitrogen or argon.

Although the polymer-forming reaction may be conducted in the absence of a catalyst, one may, if desired, employ a typical ester exchange catalyst, such as metallic lithium, potassium, calcium or magnesium. The amount of such catalyst, if used, is usually small, ranging from about 0.001% to about 0.1%, based on the weight of the dihydric phenols employed.

In the solution methods of preparation, the aromatic polycarbonate emerges from the reaction in either a true or pseudo solution depending on whether an aqueous base or pyridine is used as an acid acceptor. The copolymer may be precipitated from the solution by adding a polymer nonsolvent, such as heptane or isopropanol. Alternatively, the polymer solution may be heated, typically under reduced pressure, to evaporate the solvent.

The methods and reactants described above for preparing carbonate polymers suitable for use in the practice of this invention are discussed in greater detail in Moyer, U.S. Pat. No. 2,970,131 (Union Carbide); Schnell, U.S. Pat. No. 3,028,365 (Bayer AG); Campbell, U.S. Pat. No. 4,384,108 (GE): Glass U.S. Pat. No. 4,529,791 (Dow): and Grigo, U.S. Pat. No. 4,677,162 (Mobay), each being incorporated as a part hereof.

A preferred aromatic polycarbonate is characterized by repeated units corresponding to the general formula:

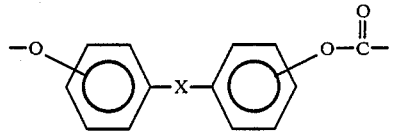

wherein X is a divalent $C_1$–$C_{15}$ hydrocarbon radical, a single bond, —O—, —S—, —$S_2$—, —SO—, —$SO_2$—, or —CO—. Each aromatic ring may additionally contain, instead of hydrogen, up to 4 substituents such as $C_1$–$C_4$ alkyl hydrocarbon or alkoxy radicals, aryl or aryloxy radicals, or halo radicals.

Although the polycarbonates mentioned above, such as those derived from 2,2-bis(4-hydroxyphenyl)propane ("Bisphenol-A" or "Bis-A") or from 1,1-bis(4-hydroxyphenyl)-1-phenyl ethane ("Bisphenol-A-P" or "Bis-A-P"), can each be employed in this invention as a homopolymer, the carbonate polymers used herein can also be derived from two or more bisphenols, two or more acid- or hydroxy-terminated reactants such as dicarboxylic acids or alkylene glycols, or from two or more different dihydroxy compounds, or mixtures of any of the foregoing, in the event a carbonate copolymer or interpolymer rather than a homopolymer is desired. For example, a carbonate copolymer can be formed when Bis-A and Bis-A-P are reacted together with a carbonate precursor under the conditions described above. Copolymers can also be formed when a bisphenol is reacted with a carbonic acid derivative and a polydiorganosiloxane containing α,ω-bishydroxyaryloxy terminal groups to yield a siloxane/carbonate block copolymer [as are discussed in greater detail in Paul, U.S. Pat. No. 4,569,970 (Bayer), incorporated as a part hereof], or when a bisphenol is reacted with a bis(ar-haloformylaryl) carbonate to yield and alternating copolyestercarbonate. The bis(ar-haloformylaryl) carbonate is formed by reacting a hydroxycarboxylic acid with a carbonic acid derivative under carbonate forming conditions, and the copolyestercarbonates are discussed in greater detail in Swart, U.S. Pat. No. 4,105,533 (Dow), incorporated as a part hereof. The term "polycarbonate" as used herein, and in the claims appended hereto, should therefore be understood to include carbonate homopolymers, carbonate copolymers (as described above), and/or blends of carbonate homopolymers and/or carbonate copolymers.

Olefin Copolymer. An olefin copolymer which contains a carbonyl functionality in its backbone is advantageously utilized in this invention for purposes of preparing a grafted copolymer, and the preferred such olefin copolymer is ethylene/carbon monoxide ("ECO"). ECO is formed from ethylene and carbon monoxide in a pressure vessel using a peroxy catalyst or a metallic or palladium compound as the catalyst. A hydrocarbon liquid which is non-reactive under the polymerization conditions is used as a diluent and reaction medium, and any such medium which acts as a solvent for the catalyst system and in which the catalyst is stable is typically suitable for use as the reaction medium. Air and water are preferably excluded from the reaction chamber. The polymerization can be performed at temperatures in the range from as low as 10° C. up to 200° C., but is preferably run in the range of 50° C. to 140° C. Pressures as high as 3,000 atmospheres (303 MPa) may be employed in the reaction, but the usual pressure of operation is in the range of 20 atmospheres (2.02 MPa)

to about 1,500 atmospheres (151.5 MPa). Both yield and molecular weight increase with increasing pressure. Alternatively, an olefin/carbon monoxide copolymer can be made without solvent under high pressure conditions, using a free radical initiator in a stirred autoclave.

A variety of olefin monomers in place of ethylene, and numerous vinyl monomers in addition to ethylene, can be used to form the olefin copolymer backbone along with carbon monoxide. Any ethylenically unsaturated compound containing the >C=C< alkene bond which will undergo polymerization across the double bond can form part of the olefin/carbon monoxide ("olefin/CO") copolymer backbone, although olefin monomers such as propylene, isobutylene and 1-butene, and vinyl monomers such as butadiene, allyl esters, vinyl acetate, vinyl chloride, vinyl aromatics such as styrene, alkyl acrylates such as ethyl acrylate, acrylonitrile, tetrafluoroethylene and other vinyl monomers and other substituted and un-substituted higher $C_1$-$C_8$ alpha alkenes or alpha mono-olefins, and mixtures of the foregoing, are preferred. The portion of the olefin/CO copolymer used in this invention derived from carbon monoxide is from about 0.1% to about 40%, and preferably from about 0.5% to about 30%, by weight. A copolymer of carbon monoxide and an alpha-mono-olefin, and methods for preparation thereof, as described above, are discussed in greater detail in Lancaster, U.S. Pat. No. 4,600,614 (Dow), Brubaker, U.S. Pat. No. 2,495,286 (DuPont), Loeb, U.S. Pat. No. 3,083,184 (Union Carbide), Fenton, U.S. Pat. No. 3,530,109 (Union Oil) and Nozaki, U.S. Pat. No. 3,694,412 (Shell), each being hereby incorporated as a part hereof.

What is set forth above concerning methods of making ECO applies equally to other forms of said olefin/CO copolymer which result from variation in the backbone monomer mix. The backbone of the olefin/CO copolymer used in this invention can be made (in conjunction with carbon monoxide) from any of the various monomers, and can be made by any of the various methods, which are included above in the discussion relating specifically to the manufacture of ECO. However, the most preferred olefin/CIO copolymer is ECO.

Grafted Olefin/CO Copolymer. In this invention, a grafted olefin/CO copolymer is prepared by polymerizing one or more vinyl or vinylidene monomers, especially those containing a polar or electronegative group or functionality, in the form of chains grafted onto a polymeric backbone consisting of an olefin copolymer having carbon monoxide ("CO") units in the backbone. Examples of such monomers are methyl acrylate, methyl methacrylate, maleic anhydride, glycidyl methacrylate, vinyl acetate, a vinyl aromatic hydrocarbon such as styrene, and a vinyl cyanide such as acrylonitrile, or mixtures thereof. The manner by which this graft polymerization is accomplished is not critical to this invention, and can be the result of any known method. Typically, but not necessarily, the monomer(s) of which the grafting chain is composed is/are brought into contact with the olefin/CO copolymer polymeric backbone, and the grafting polymer chains will form, and graft to the backbone, in situ. However, the grafting chain could be formed first, from vinyl and/or vinylidene monomer(s), as a polymer or (copolymer) in its own right and then grafted onto the polymeric backbone. The graft polymerization can be initiated, for example, by free radical processes, by irradiation or by ionic means. The polymeric backbone and grafting monomer(s) can be brought together (1) in a suspension where the polymeric backbone is dissolved in the monomer(s) or the polymeric backbone is swelled with the monomer(s) prior to the grafting; (2) in an emulsion where the polymeric backbone is dispersed in a latex polymerization of the monomer(s): or (3) in a bulk system where a partial polymerizate of the grafting polymer or (copolymer) is formed and then the partial polymerizate is mixed with a solution of the polymeric backbone in liquid monomer and the grafting is completed under high shearing conditions. The graft polymerization can be performed in a standard reaction vessel or in the barrel of an extruder to yield product in the form of the grafted copolymer.

Other monomers which can be grafted onto an olefin/CO copolymer polymeric backbone are vinyl compounds (especially when they bear a polar, electronegative group or functionality) such as vinyl toluene, alphamethyl styrene, halogenated styrene, methacrylonitrile or alpha-halogenated acrylonitrile: a $C_1$-$C_8$ alkyl acrylate such as ethyl acrylate, hexyl acrylate or hydroxy ethyl acrylate: a $C_1$-$C_8$ alkyl methacrylate such as hexyl methacrylate: an acrylic or methacrylic acid: the vinylidene monomers, especially when they bear a polar, electronegative group or functionality such as a halogen group, or an organic group having a double or triple bond such as phenyl, carboxy, cyano or the like; vinyl chloride, vinyl acetate, vinylidene chloride or vinyl esters or vinyl ethers: styrene and substituted derivatives thereof: maleimides: mononitriles having alpha-beta-olefinic unsaturation and lower alkyl or halogen substituents; esters of olefinically unsaturated carboxylic acids: vinyl esters; vinyl ethers: alpha-olefins: vinyl toluenes: vinyl xylenes; the maleates: the fumarates: and the like: or mixtures of two or more of any of the foregoing. In general, vinyl and vinylidene monomers from groups such as the vinyl and vinylidene -esters, -ethers, -organic acids, -epoxies, -aromatics, -alcohols, -halides, -nitriles and -amides, or mixtures thereof, can be used as the monomers to be grafted onto the olefin/CO copolymer. The portion of the grafted olefin/CO copolymer of this invention derived from the monomer(s), polymer(s) or copolymer(s) grafted onto the polymeric backbone is from about 1% to about 50%, and preferably from about 5% to about 30%, by weight of the grafted copolymer. The systems and methods of graft polymerization described above are discussed in more detail in Olener, U.S. Pat. No. 4,536,545 (Occidental), and Strait, U.S. Pat. No. 4,762,890 (Dow), each of which is hereby incorporated as a part hereof.

Toughening Agent. The toughening agent optionally used in this invention can be made from any suitable rubber or elastomer. Although one skilled in the art would be able to select a substance containing an appropriate type and amount of rubber, a few representative types of rubber or elastomeric compounds suitable for use in this invention as a toughening agent are described below to illustrate the variation in the known substances which would suffice for such purpose. The rubber content of the toughening agent used in this invention is greater than 40% by weight, and a mixture of two or more of the rubbers mentioned below can be used as the toughening agent. Each of the patents cited in the following description of rubber and elastomeric toughening agents, and methods for the preparation thereof, is hereby incorporated as a part hereof.

An acrylic elastomer is known for exceptionally good resistance to ozone, oxidation and the effects of hot oil as a result of its saturated backbone. It is made up primarily of acrylates, but also sometimes includes ethylene in the backbone for flexibility. Acrylic elastomers can be made by both the emulsion and suspension processes and are discussed in greater detail in Aloia, U.S. Pat. No. 3,976,611 (Am. Cyanamid).

Butyl rubber is almost free of unsaturation as it is the product of copolymerizing isobutylene and isoprene where the isoprene typically makes up no more than 2.5 mole percent of the copolymer. It therefore has essentially the same good resistance to oxidation and other degradative effects that acrylic elastomers do. Although the solution process is used to manufacture butyl rubber, most of it is made by a precipitation (slurry) method wherein the monomers are copolymerized in methyl chloride diluent using a catalyst such as aluminum chloride. Butyl rubbers, as described above, are discussed in greater detail in Green, U.S. Pat. No. 2,401,754 (Standard Oil) and Nelson, U.S. Pat. No. 2,462,123 (Standard Oil).

The chlorosulfonated polyethylene rubbers are prepared by bubbling a mixture of chlorine and sulfur dioxide into a solution containing polyethylene, and the rubber product typically contains 20-40% chlorine as secondary alkyl chlorides and 1-2% sulfur as secondary sulfonyl chlorides. Chlorosulfonated polyethylene rubbers, as described above, are discussed in greater detail in Beekly, U.S. Pat. No. 2,640,048 (DuPont) and Kalil, U.S. Pat. No. 2,923,979 (DuPont).

Although the presence of the pendant methyl group gives EPM (ethylene/propylene) rubber a structure similar to that of natural rubber, EPM rubber has no double bonds in the backbone. It therefore has the good resistance associated with unsaturation to the chain scission and cross linking caused by the degrading effects of light, heat, oxygen and ozone. The ratio of ethylene to propylene in EPM rubber is from about 50/50 to about 75/25. However, this lack of unsaturation in the backbone precludes vulcanization, and a diene is therefore frequently added to the copolymer to furnish a pendant group containing an addition polymerizable C=C bond. The diene, which can be straight chain or cyclic, should not be conjugated, and the two C=C bonds should have different activities with respect to polymerization. When a diene is copolymerized with ethylene and propylene, the product is known as EPDM rubber. EPM/EPDM rubbers, which can be made by the solution process, are described above and are discussed in greater detail in Paige, U.S. Pat. No. 3,341,503 (Uniroyal).

Fluorinated rubbers, such as the fluorocarbon elastomer poly(tetrafluoroethylene-co-propylene), are made in a high pressure, free radical aqueous emulsion, using organic or inorganic peroxy compounds as initiators. A fluorinated carboxylic acid soap is usually used as the emulsifying agent. Fluorinated elastomers and methods for making same, as described above, are discussed in greater detail in Rexford, U.S. Pat. No. 3,051,677 (DuPont), Honn, U.S. Pat. No. 3,053,818 (3M) and Pailthorp, U.S. Pat. No. 2,968,649 (DuPont).

Formation of neoprene rubber by polymerization of 2-chloro-1,3-butadiene can result from addition involving both of the double bonds, or through just one of the two leaving the other as a pendant group. Addition is 95% through both bonds at −40° C. and decreases to 70% at 100° C. Addition can be head-to-head, head-to-tail or tail-to-tail. Neoprene rubber is typically made by free radical batch emulsion polymerization, but can also be made in a continuous process. Neoprene rubber, as described above, is discussed in greater detail in Collins, U.S. Pat. No. 1,967,865 (DuPont) and Aho, U.S. Pat. No. 2,831,842 (DuPont).

Nitrile rubber, which is polymerized from 1,3butadiene and acrylonitrile, typically has about 15–50% acrylonitrile content. The presence of the polar —CN group gives this rubber good resistance to non-polar hydrocarbon oils and solvents, but the residual C=C bond in the backbone exposes the molecule to the embrittlement caused by the cross-linking which results from oxidative degredation. It is usually preferred to make nitrile rubbers by emulsion, as an aqueous system is more easily operated than one, for example, requiring a solvent. Nitrile rubber and methods for making same, as described above, are discussed in greater detail in Konrad, U.S. Pat. No. 1,973,000 (I. G. Farbenindustrie AG).

As with rubbers involving derivatives of butadiene, formation of polybutadiene can be by either 1,4 or 1,2 (vinyl) addition of the butadiene molecule. 1,4 products are either cis or trans, and vinyl products are classified as to tacticity. Cis-polybutadiene is a soft, easily solvated material with excellent resilience and dynamic properties, whereas trans-polybutadiene is a hard, rigid material which is difficult to dissolve. Polybutadiene rubber is typically manufactured by solution polymerization, using organic lithium compounds or coordination catalysts containing metals in reduced valence states. Polybutadiene rubber, as described above, is discussed in greater detail in Brockway, U.S. Pat. No. 2,977,349 (Goodrich Gulf) and Ueda, U.S. Pat. No. 3,170,907 (Bridgestone).

Polyisoprene, with its pendant methyl group on what would otherwise be a butadiene unit, also polymerizes in cis-1,4, trans-1,4 or 1,2 (vinyl) form. Cis-1,4 polyisoprene, the synthetic equivalent of natural rubber, is, expectedly, a soft elastic material, while the trans isomer is hard and crystalline and is used, for example, to make golf ball covers. Ziegler catalysts can be used in the polymerization, and, when the Ti/Al ratio therein is approximately 1, the product will be 98–99% cis, whereas when the Ti/Al ratio is increased to about 2, the product is all trans. Polyisoprene and methods for making same, as described above, are discussed in greater detail in Kahn, U.S. Pat. No. 3,165,503 (Goodrich).

Polyether rubbers include epichlorohydrin elastomers, which can be prepared either by a coordination polymerization mechanism using an aluminum alkyl-water catalyst in a hydrocarbon solvent, or in solution using benzene, toluene or methylene chloride as the solvent. Propylene oxide elastomers can also be prepared in solution, by copolymerization with allyl glycidyl ether, using a coordination catalyst such as diethyl zinc water. Polyether rubbers, as described above, are discussed in greater detail in Vandenberg, U.S. Pat. No. 3,634,303 (Hercules) and Vandenberg, U.S. Pat. No. 3,639,267 (Hercules).

Thermoplastic elastomers include, for example, styrene-diene ABA block copolymers, which have a rigid block "A" having a $T_g$ above room temperature and a rubbery block "B" having a $T_g$ below room temperature. Styrene-diene block copolymers, as described above, are discussed in greater detail in Holden, U.S. Pat. No. 3,265,766 (Shell) and Prudene, U.S. Pat. No. 3,949,020 (Godyear). Other thermoplastic elastomers are those based on urethane, such as described in Schollenberger, U.S. Pat. No. 3,015,650 (B. F. Goodrich) and Saunders, U.S. Pat. No. 3,214,411 (Mobay): or those based on copolyester-ether, such as described in Witsiepe, U.S. Pat. No. 3,651,014 (DuPont).

An SBR rubber is a copolymer of styrene and butadiene which typically contains about 23% styrene. Of the butadiene content, about 18% of it is cis, 65% is trans and 17% is vinyl. The monomers themselves can be randomly dispersed along the backbone, or blocks of each monomer can be randomly dispersed. SBR rubbers, as described above, are discussed in greater detail in Zelinski, U.S. Pat. No. 2,975,160 (Phillips) and Zelinski, U.S. Pat. No. 3,281,383 (Phillips).

An MBS rubber contains a substrate latex, or core, which is made by polymerizing a conjugated diene, or by copolymerizing a conjugated diene with a mono-olefin or polar vinyl compound, such as styrene, acrylonitrile or methyl methacrylate. The substrate latex is typically made up of about 45–75% conjugated diene and about 25–55% of the mono-olefin or polar vinyl compound. A mixture of monomers is graft polymerized to the substrate latex. A variety of monomers may be used for this grafting purpose, of which the following are exemplary: vinyl compounds such as vinyl toluene, alpha-methyl styrene, halogenated styrene, naphthalene, acrylonitrile, methacrylonitrile or alpha-halogenated acrylonitrile, or a $C_1$–$C_8$ alkyl acrylate such as methacrylate, ethylacrylate or hexyl acrylate, a $C_1$–$C_8$ alkyl methacrylate such as methyl methacrylate, ethyl methacrylate or hexyl methacrylate, an acrylic or methacrylic acid, or a mixture of two or more of the foregoing. The extent of grafting is sensitive to the substrate latex particle size, and particle size may be influenced by controlled coagulation techniques among other methods. When the graft level is allowed to reach an excessively high level, the rubbery effect of the relative substrate latex content is reduced.

The grafting monomers may be added to the reaction mixture simultaneously or in sequence, and, when added in sequence, layers, shells or wart-like appendages can be built up around the substrate latex, or core. The monomers can be added in various ratios to each other although, when just two are used, they are frequently utilized in equal amounts. A typical weight ratio for an MBS rubber is about 60–80 parts by weight substrate latex, about 10–20 parts by weight first monomer and about 10–20 parts by weight second monomer. A preferred formulation of an MBS rubber is one having a core built up from about 71 parts of butadiene, about 3 parts of styrene, about 4 parts of methyl methacrylate and about 1 part of divinyl benzene: a second phase of about 11 parts of styrene: and a shell phase of about 11 parts of methyl methacrylate and about 0.1 part of 1,3-butylene glycol dimethacrylate, where the parts are by weight of the total composition. A product having substantially such content is available commercially from Rohm and Haas Company as Paraloid TM EXL 3607 core-shell polymer. The MBS rubber and methods for making same, as described above, are discussed in greater detail in Saito, U.S. Pat. No. 3,287,443 (Kanegafuchi), Curfman, U.S. Pat. No. 3,657,391 (Borg-Warner) and Fromuth, U.S. Pat. No. 4,180,494 (Rohm and Haas), each of which is hereby incorporated as a part hereof.

A butyl acrylate rubber has a first phase forming an elastomeric core and a second phase forming a rigid thermoplastic phase about said elastomeric core. The elastomeric core is formed by emulsion or suspension polymerization of monomers which consist of at least about 50 weight percent alkyl and/or aralkyl acrylates having up to fifteen carbon atoms, and, although longer chains may be used, the alkyls are preferably $C_2$–$C_6$. The elastomeric core phase should have a $T_g$ of less than about 25° C., and preferably less than about 0° C.

The rigid thermoplastic phase of the butyl acrylate rubber is formed on the surface of the elastomeric core using suspension or emulsion polymerization techniques. The monomers necessary to create this phase together with necessary initiators are added directly to the reaction mixture in which the elastomeric core is formed, and polymerization proceeds until the supply of monomers is substantially exhausted. Monomers such as a $C_1$–$C_8$ alkyl acrylate like methyl acrylate, ethyl acrylate, hydroxy ethyl acrylate or hexyl acrylate, or a $C_1$–$C_8$ alkyl methacrylate such as methyl methacrylate or hexyl methacrylate can be used for this purpose. Either thermal or redox initiator systems can be used. Because of the presence of the graft linking agents on the surface of the elastomeric core, a portion of the chains which make up the rigid thermoplastic phase are chemically bonded to the elastomeric core. It is preferred that there be at least about 20% bonding of the rigid thermoplastic phase to the elastomeric core.

A preferred butyl acrylate rubber is made up of more than about 40% to about 95% by weight of an elastomeric core and about 60% to about 5% of a rigid thermoplastic phase. The elastomeric core can be polymerized from about 75% to about 99.8% by weight $C_1$ to $C_6$ acrylate, preferably n-butyl acrylate. The rigid thermoplastic phase can be polymerized from at least 50% by weight of $C_1$ to $C_8$ alkyl methacrylate, preferably methyl methacrylate. A product having substantially such content is available commercially from Rohm and Haas Company as Paraloid TM 3330 composite interpolymer. Butyl acrylate rubber and methods for making same, as described above, are discussed in greater detail in Owens, U.S. Pat. No. 3,808,180 (Rohm and Haas) and Witman, U.S. Pat. No. 4,299,928 (Mobay), each of which is hereby incorporated as a part hereof.

A variety of additives is available, and typically finds use in compositions such as those of this invention, for protection against thermal, oxidative and ultra-violet degradation. Such additives may be included in the composition at any point during the processing, and the choice as to which additive is employed is not critical to this invention. Representative of the thermal and oxidative stabilizers which can advantageously be utilized are hindered phenols, hydroquinones, phosphites, including substituted members of those groups and/or mixtures of more than one thereof. A preferred phenolic anti-oxidant is Irganox TM 1076 anti-oxidant, which is available from Ciba-Geigy Corp. and is discussed in greater detail in Dexter, U.S. Pat. No. 3,285,855 (Geigy), and Dexter, U.S. Pat. No. 3,330,859 (Geigy), each being hereby incorporated as a part hereof. Ultra-violet stabilizers such as various substituted resorcinols, salicylates, benzotriazoles, benzophines and hindered phenols can also be usefully included in the compositions of this invention, as can be lubricants, colorants, fillers such as talc, pigments, ignition resistant additives and mold release agents, and reinforcement agents such as fiberglass. Additives and stabilizers such as the foregoing, and many others which have not been mentioned, are known in the art, and the decision as to which, if any, to use is not critical to this invention. However, such additives, if used, will not exceed 5% by weight of the total composition.

Illustrative Embodiments. To illustrate the practice of this invention, examples of several preferred embodiments are set forth below. It is not intended, however, that these examples (Examples 1-3) should in any manner restrict the scope of this invention. Some of the "(7) P-3330" is Paraloid ™ 3330 composite interpolymer, a butyl acrylate rubber.

"(8) ESO", epoxidized soybean oil, is used as a tackifier to cause "(9) IR-1076", Irganox ™ 1076 antioxidant, to adhere to and be evenly distributed over the pellets making up the balance of the contents of each composition.

TABLE I

| | Content of Controls 1-3 and Examples 1-3 in grams | | | | | |
|---|---|---|---|---|---|---|
| | Control 1 | Control 2 | Control 3 | Example 1 | Example 2 | Example 3 |
| (1) Polycarbonate | 1,900 | 1,800 | 1,800 | 1,800 | 1,800 | 1,800 |
| (2) Olefin copolymer | — | 100 | — | — | — | — |
| (3) P-3607 | 100 | 100 | 100 | 100 | 100 | — |
| (4) ECO | — | — | 100 | — | — | — |
| (5) ECOgMMA | — | — | — | 100 | — | 100 |
| (6) ECOgSAN | — | — | — | — | 100 | — |
| (7) P-3330 | — | — | — | — | — | 100 |
| (8) ESO | 2 | 2 | 2 | 2 | 2 | 2 |
| (9) IR-1076 | 4 | 4 | 4 | 4 | 4 | 4 | particularly desirable features of this invention may be seen by contrasting the characteristics of Examples 1-3 with those of various controlled formulations (Controls 1-3) which do not possess the features of, and are not therefore embodiments of, this invention.

The polycarbonate compositions prepared in Examples 1-3 and Controls 1-3 are made by dry blending the ingredients thereof and agitating same in a paint shaker for 7 minutes. The dry blended formulations are then melt mixed in a vented 30mm Werner-Phfleiderer co-rotating, twin screw extruder using a 270° C. set temperature and 250 rpm. Each extruded composition is passed through a water bath, chopped into granules and collected for molding. Experimental samples are thoroughly dried in a circulated air oven at 105° C. for six hours prior to molding. All samples are prepared by injection molding on a 75 ton (6.8×10⁴ kg) Arburg molding machine. Molding temperatures for the barrel and mold are set at 270° C. and 190° F., respectively.

The formulations of the polycarbonate compositions of Examples 1-3 and Controls 1-3 are given in Table I in grams.

"(1) Polycarbonate" is Calibre ® 300-10 polycarbonate resin, a 10 melt flow value polycarbonate resin available from The Dow Chemical Company.

"(2) Olefin copolymer" is Dowlex ® 2045 olefin copolymer, an ethylene/1-octene copolymer available from The Dow Chemical Company.

"(3) P-3607" is Paraloid ™ 3607 core-shell polymer, an MBS rubber.

"(4) ECO" is an ethylene/carbon monoxide copolymer containing 10% carbon monoxide by weight.

"(5) ECOgMMA" is a grafted copolymer wherein methyl methacrylate ("MMA") is grafted onto an ethylene/CO copolymer. The portion of the ethylene/CO copolymer derived from carbon monoxide is 10% by weight. The portion of the ECOgMMA grafted copolymer derived from MMA is 20% by weight.

"(6) ECOgSAN" is a grafted copolymer wherein styrene and acrylonitrile are grafted onto an ethylene/CO copolymer. The portion of the ethylene/CO copolymer derived from carbon monoxide is 10% by weight. The portion of the ECOgSAN grafted copolymer derived from styrene and acrylonitrile is 20% by weight.

The results of tests performed on the blended polycarbonate compositions of Examples 1-3 and Controls 1-3 are shown below in Table II.

Tensile strength and percent elongation at break are measured in accordance with ASTM Designation D 638-84.

Environmental stress failure resistance ("ESFR") is evaluated by measuring tensile strength at break and percent elongation at break, in accordance with ASTM Designation D 638-84, with respect to samples which have been placed under 0.5% strain while submerged in a bath of 60 wt % isooctane and 40 wt % toluene for 5 minutes and then have been allowed to dry for 24 hours before testing.

The Gardner dart drop impact test is performed by dropping a 16 pound (7.26 kg) weight which carries a ½" (12.7 mm) dart onto a circular test sample which is 2½" (63.5 mm) square and ⅛" (3.175 mm) thick. The weighted dart falls freely on a slotted track and impacts the sample, which is secured in position in the path of descent on an aluminum cast base with a 0.640 inch (16.26 mm) hole to accept the dart after it impacts the sample. The instrument is a Pacific Scientific model #IG-1120. The sample fails if it shows a crack or perforation on the side on which impact did not occur. The results are recorded as either pass (no perforation by the dart at the point of impact) or fail (material exhibits crack or perforation) when the dart has developed a particular amount of energy by falling from the necessary height on the track, as indicated thereon, to develop such energy. The amount of energy recorded in Table II is the greatest energy a sample was able to accept without failing, and then that at which it failed, except with respect to Examples 1-3, which passed at 640 in-lb, the greatest amount of energy the instrument is capable of developing.

Impact resistance is measured by the Izod test according to ASTM Designation D 256-84 (Method A). The notch is 10 mils (0.254 mm) in radius. An inverted T (⊥) indicates that the notch is cut so that the flexural shock caused by the striking nose of the pendulum is propagated parallel to the direction of flow taken by the molten extrudate during formation of the sample. Vertical parallel lines ( || ) indicate that the notch is cut so that the flexural shock caused by the striking nose of the pendulum is propagated perpendicular to the direction of flow taken by the molten extrudate during formation of the sample.

Weldline Izod strength is also measured according to ASTM Designation D 256-84 (Method A), but with respect to a sample which has been formed with a butt weld in a double gated mold. The sample is unnotched, and it is placed in the vise so that the weld is coincident with the top surface of the vise jaws. The result of such measurement, reported in ft-lb/in (and J/m), is sometimes hereinbelow referred to as the "weldline Izod value".

polycarbonate. A distinct, unexpected improvement in a balance of several different physical properties of polycarbonate is therefore obtained by blending it in a composition with a grafted olefin/CO copolymer, and the components present together with polycarbonate in such composition show reduced tendency toward phase separation by delamination or splintering, or toward brittle failure.

These results demonstrate that the grafted olefin/CO copolymer of this invention functions as a strengthening substance which, when in admixture in an effective

TABLE II

Test Results of Controls 1-3 and Examples 1-3

|  | Control 1 | Control 2 | Control 3 | Example 1 | Example 2 | Example 3 |
|---|---|---|---|---|---|---|
| Tensile Strength at Break | 9,377 psi 64.6 MPa | 8,794 psi 60.6 MPa | 8,650 psi 59.6 MPa | 9,218 psi 63.6 MPa | 9,011 psi 62.1 MPa | 7,918 psi 54.6 MPa |
| % Elong. at Break | 115 | 113 | 108 | 121 | 120 | 83 |
| ESFR Tensile Strength at Break | 3,625 psi 25.0 MPa | 6,994 psi 48.2 MPa | 7,316 psi 50.4 MPa | 9,214 psi 63.5 MPa | 9,036 psi 62.3 MPa | 7,173 psi 49.5 MPa |
| ESFR % Elong. at Break | 2 | 6 | 61 | 122 | 124 | 86 |
| Izod Weldline | 35.6 ft-lb/in 1,900.3 J/m | 3.2 ft-lb/in 170.8 J/m | 3.3 ft-lb/in 176.1 J/m | 20.4 ft-lb/in 1,088.9 J/m | 14.4 ft-lb/in 768.7 J/m | 20.3 ft-lb/in 1,083.6 J/m |
| Dart Drop Pass | 600 in-lb 10,087 J | 560 in-lb 9,111 J | 480 in-lb 7,810 J | 640 in-lb 10,413 J no crack | 640 in-lb 10,413 J no crack | 640 in-lb 10,413 J no crack |
| Dart Drop Fail | 620 in-lb 9,762 J | 600 in-lb 9,762 J | 510 in-lb 8,298 J | — | — | — |
| Izod, ⊥, 23° C. | 12.6 ft-lb/in 672.6 J/m | 7.8 ft-lb/in 416.4 J/m | 8.6 ft-lb/in 459.1 J/m | 10.7 ft-lb/in 571.1 J/m | 11.5 ft-lb/in 613.9 J/m | 13.1 ft-lb/in 699.3 J/m |
| Izod, ⊥, 0° C. | 11.6 ft-lb/in 619.2 J/m | 6.7 ft-lb/in 357.6 J/m | 7.3 ft-lb/in 389.7 J/m | 8.4 ft-lb/in 448.4 J/m | 9.1 ft-lb/in 485.7 J/m | 10.8 ft-lb/in 576.5 J/m |
| Izod, ∥, 23° C. | 12.5 ft-lb/in 667.2 J/m | 11.7 ft-lb/in 624.5 J/m | 11.9 ft-lb/in 635.2 J/m | 12.3 ft-lb/in 656.6 J/m | 12.7 ft-lb/in 677.9 J/m | 12.2 ft-lb/in 651.2 J/m |
| Izod, ∥, −30° C. | 10.1 ft-lb/in 539.1 J/m | 7.9 ft-lb/in 421.7 J/m | 11.0 ft-lb/in 587.2 J/m | 7.6 ft-lb/in 405.7 J/m | 7.3 ft-lb/in 389.7 J/m | 5.2 ft-lb/in 277.6 J/m |

It can be seen from these test results that, when polycarbonate is blended with a polyolefin (Control 2), its ESFR is improved over polycarbonate without a polyolefin (Control 1), as shown by percent elongation at break. However, that improvement in ESFR is accomplished at the expense of weldline strength and dart impact resistance, and poor weldline strength and reduced dart impact resistance can be conditions which indicate a potential that delamination of component(s) blended with polycarbonate will occur. The Izod values are also lower for the polyolefin-modified polycarbonate (Control 2) than for polycarbonate not so modified (Control 1).

On the contrary, when polycarbonate is blended with a grafted olefin/CO copolymer, substantial improvement in ESFR properties over Control 1 is obtained, and, surprisingly, weldline, dart impact and notched Izod performance superior to that of polyethylene-modified polycarbonate (Control 2) results as well. Although the blended composition containing polycarbonate and ECO (Control 3) had an ESFR percent elongation value which was improved over Control 1, the weldline Izod and dart drop values, and the improvement in ESFR percent elongation, are not as high for Control 3 as they are for Examples 1-3, wherein a grafted olefin/CO copolymer has been admixed with amount in a polycarbonate composition, imparts, to objects molded from such composition, substantially improved environmental stress failure resistance without substantial loss in impact resistance. The compositions of this invention desirably have at least 10% elongation at break, when tested according to ASTM Designation D 638-84 after having been placed under 0.5% strain while submerged in a bath of 60 wt % isooctane and 40 wt % toluene for 5 minutes and then dried for 24 hours before testing, and have a weldline Izod value of at least 4.5 ft-lb/in, and preferably have at least 20% elongation (when measured as aforesaid) and have a weldline Izod value of at least 7.0 ft-lb/in.

The results set forth above demonstrate that the grafted olefin/CO copolymer of this invention also functions as an anti-delamination agent. An anti-delamination agent for purposes of this invention, and the claims appended hereto, can be defined as a substance which, when in admixture in an effective amount with a composition of matter comprising an aromatic polycarbonate, measurably increases either (1)

(a) the percent elongation at break of said composition, when tested according to ASTM Designation D 638-84 after having been placed under 0.5% strain while submerged in a bath of 60 wt % isooctane and 40 wt % toluene for 5 minutes and then dried for 24 hours before testing, and (b) the weldline Izod value of said composition, as compared to the percent elongation (when measured as aforesaid) and weldline Izod value of an aromatic polycarbonate composition not admixed with such a substance: or (2)

(c) the tensile strength at break of said composition, when tested according to ASTM Designation D 638-84 after having been placed under 0.5% strain while submerged in a bath of 60 wt % isooctane and 40 wt % toluene for 5 minutes and then dried for 24 hours before testing, and (d) the highest energy level at which said composition shows no crack when subjected to impact by a falling dart on a Gardner drop dart instrument, as compared to the tensile strength (when measured as aforesaid) and highest energy level of a composition of an aromatic polycarbonate not admixed with such a The performance of the grafted olefin/CO copolymer as an anti-delamination agent makes available a method of protecting an article molded from an aromatic polycarbonate composition from delamination, wherein said composition is admixed with an anti-delamination agent, and said article is then molded from said composition in such admixture: as well as a method of molding an article from an aromatic polycarbonate composition by molding said composition in the presence of an anti-delamination agent admixed with said composition.

It is within the skill in the art to practice this invention in numerous modifications and variations in light of the above teachings. It is, therefore, to be understood that the various embodiments of this invention described herein may be altered without departing from the spirit and scope of this invention as defined by the appended claims.

What is claimed is:

1. A composition of matter comprising, in admixture, an aromatic polycarbonate and an olefin/carbon monoxide copolymer grafted with one or more vinyl or vinylidene monomers or polymers or copolymers of such monomers or mixtures thereof.

2. The composition of claim 1 wherein the olefin/carbon monoxide copolymer is grafted with at least one vinyl monomer.

3. The composition of claim 1 wherein the portion of the grafted olefin/carbon monoxide copolymer derived from the grafting monomer(s), polymer(s), copolymer(s) or mixtures thereof is from about 1% to about 50% by weight of the grafted olefin/carbon monoxide copolymer.

4. The composition of claim 2 wherein the olefin/carbon monoxide copolymer is grafted with at least one vinyl monomer selected from the group consisting of an acrylate, a methacrylate, an acetate and a mixture thereof.

5. The composition of claim 4 wherein the olefin/carbon monoxide copolymer is grafted with a mixture of an acrylate and a methacrylate.

6. The composition of claim 2 wherein the olefin/carbon monoxide copolymer is grafted with a mixture of a vinyl acetate monomer and a vinyl compound derived from acrylic acid.

7. The composition of claim 2 wherein the olefin/carbon monoxide copolymer is grafted with a mixture of a vinyl aromatic compound and a vinyl cyanide.

8. The composition of claim 7 wherein the olefin/carbon monoxide copolymer is grafted with a mixture of styrene and acrylonitrile.

9. The composition of claim 1 wherein the olefin/carbon monoxide copolymer is grafted with one or more polymer(s), copolymer(s) or mixtures thereof polymerized from at least one vinyl monomer, vinylidene monomer or a mixture thereof.

10. The composition of claim 9 wherein the olefin/carbon monoxide copolymer is grafted with styrene/acrylonitrile copolymer.

11. The composition of claim 1 wherein said olefin/carbon monoxide copolymer is a copolymer of ethylene and carbon monoxide.

12. The composition of claim 1 wherein the portion of the olefin/carbon monoxide copolymer derived from carbon monoxide is about 0.1% to about 40% by weight.

13. The composition of claim 1 further comprising an elastomeric toughening agent containing greater than 40% rubber by weight.

14. The composition of claim 13 wherein the content thereof is about 40% to about 99% aromatic polycarbonate, about 1% to about 60% grafted olefin/carbon monoxide copolymer, and up to about 20% elastomeric toughening agent, by weight of the total composition.

15. The composition of claim 13 in dry blended, particulate form.

16. The composition of claim 13 which as been melt mixed.

17. The composition of claim 13 in the form of a master batch.

18. The composition of claim 13 in the form of a molded article.

19. The composition of claim 13 in the form of an extruded sheet.

20. The molded article of claim 18 wherein the grafted olefin/carbon monoxide copolymer is an ethylene/carbon monoxide copolymer grafted with styrene and acrylonitrile, and the elastomeric toughening agent contains a core substrate formed from conjugated diene, mono-olefin or polar vinyl compounds, and one or more shells formed from vinyl compounds grafted to such core.

21. The extruded sheet of claim 19 wherein the grafted olefin/carbon monoxide copolymer is an ethylene/carbon monoxide copolymer grafted with methyl methacrylate, and the elastomeric toughening agent is a butyl acrylate rubber.

22. A method of molding an article from an aromatic polycarbonate comprising molding said aromatic polycarbonate in the presence of an olefin/carbon monoxide copolymer grafted with one or more vinyl or vinylidene monomers or polymers or copolymers of such monomers or mixtures thereof.

23. A method of measurably increasing
   (a) the percent elongation at break of an aromatic polycarbonate, when tested according to ASTM Designation D 638-84 after having been placed under 0.5% strain while submerged in a bath of 60 wt % isooctane and 40 wt % toluene for 5 minutes and then dried for 24 hours before testing, and
   (b) the weldline Izod value of said aromatic polycarbonate,
comprising admixing with said aromatic polycarbonate an olefin/carbon monoxide copolymer grafted with one or more vinyl vinylidene monomers polymers or copolymers of such monomers or mixtures thereof.

24. A method of measurably increasing
(a) the tensile strength at break of an aromatic polycarbonate, when tested according to ASTM Designation D 638-84 after having been placed under 0.5% strain while submerged in a bath of 60 wt % isooctane and 40 wt % toluene for 5 minutes and then dried for 24 hours before testing, and
(b) the highest energy level at which said aromatic polycarbonate shows no crack when subjected to impact by a falling dart on a Gardner drop dart instrument, comprising admixing with said aromatic polycarbonate an olefin/carbon monoxide copolymer grafted with one or more vinyl or vinylidene monomers or polymers or copolymers of such monomers or mixtures thereof.

* * * * *

UNITED STATES PATENT AND TRADEMARK OFFICE
CERTIFICATE OF CORRECTION

PATENT NO. : 4,929,672

DATED : May 29, 1990

INVENTOR(S) : Michael K. Laughner

It is certified that error appears in the above-identified patent and that said Letters Patent is hereby corrected as shown below:

```
Col. 5, line 42, "CIO" should read, --CO--.
Col. 6, line 24, "methacrylate:" should read --methacrylate;--.
Col. 6, line 24, "acid:" should read --acid;--.
Col. 6, line 22, "acrylate:" should read --acrylate;--.
Col. 6, line 29, "ethers" should read --ethers;--
Col. 6, line 30, "thereof:" should read --thereof;--.
Col. 6, line 31, "maleimides:" should read --maleimides;--.
Col. 6, line 34, "acids:" should read --acids;--.
Col. 6, line 34, "ethers:" should read --ethers;--.
Col. 6, line 33-34 "olefins: should read --olefins;--.
Col. 6, line 35, "toluenes:" should read --toluenes;--.
Col. 6, line 35, "maleates:" should read --maleates;--.
Col. 8, line 7, "1, 3butadi-" should read --1, 3-butadi---.
```

UNITED STATES PATENT AND TRADEMARK OFFICE
CERTIFICATE OF CORRECTION

PATENT NO. : 4,929,672

DATED : May 29, 1990

INVENTOR(S) : Michael K. Laughner

It is certified that error appears in the above-identified patent and that said Letters Patent is hereby corrected as shown below:

Col. 9, line 3, "(mobay):" should read --(Mobay);--.

Col. 9, line 53, "styrene:" should read --styrene;--.

Col. 15, line 20, "such a" should read --such a substance.--.

Col. 15, line 27, "admixture:" should read --admixture:--.

Col. 16, line 29, "which as" should read --which has--.

Col. 16, line 67, "vinyl vinylidene monomers polymers" should read --vinyl or vinylidene  monomers or polymers--.

Signed and Sealed this

Twenty-first Day of July, 1992

Attest:

DOUGLAS B. COMER

*Attesting Officer*     *Acting Commissioner of Patents and Trademarks*